Sept. 16, 1969 F. C. BOLICK, JR 3,467,791

DEVICE TO INDICATE THE NET MOTION OF A TAPE IN
ONE OF TWO DIRECTIONS OF TRAVEL
Filed March 8, 1967

INVENTOR
FRED C. BOLICK, JR.
Newton, Hopkins, Jones & Ormsby
ATTORNEYS

United States Patent Office 3,467,791

Patented Sept. 16, 1969

3,467,791

DEVICE TO INDICATE THE NET MOTION OF A TAPE IN ONE OF TWO DIRECTIONS OF TRAVEL

Fred C. Bolick, Jr., Atlanta, Ga., assignor to Lanier Electronic Laboratory, Inc., Atlanta, Ga., a corporation of Georgia Filed Mar. 8, 1967, Ser. No. 621,641
Int. Cl. G11b *5/02, 5/78*
U.S. Cl. 179—100.2 9 Claims

ABSTRACT OF THE DISCLOSURE

What is disclosed herein is a tape device of the type in which a tape is moved relative to an electro-magnetic head in two directions and having an accumulating means for accumulating increments of a quantity such as increments of time or tape length which are proportional to the net motion of the tape in one of the two directions in connection with a particular operation of the tape device such as a transcribing operation. More specifically, what is disclosed is a tape device including a cumulating means which serves as an indicating means for indicating the accumulated increments of operating time corresponding to the motion of a tape relative to an electro-magnetic head in a first direction, and a control means for excluding from the increments of operating time accumulated by the cumulating means those increments of operating time which correspond to the motion of the tape relative to the electro-magnetic head in the first direction that is required to return the tape to its position prior to motion of the tape in a second direction or that is otherwise not in connection with a particular operation of the tape device. In one of the embodiments of the invention, the control means is a circuit means for energizing the cumulating means only when the tape is moving in the first direction in connection with a particular operating function such as the recording of dictation. In another embodiment of the invention, the control means includes a condition means for progressively changing the condition of the tape from a first condition to a second condition as the tape moves relative to the electro-magnetic head in a second direction, and a signal means responsive to the second condition of the tape for rending the cumulating means inoperative as tape in the second condition moves relative to the electro-magnetic head in the first direction. Regardless of embodiment, the control means serves to exclude from the increments of time, tape length or the like accumulated by the cumulating means, substantially all of those increments corresponding to that tape motion in the first direction which do not advance a particular operation of the tape device.

BACKGROUND OF THE INVENTION

Field of the invention

This invention relates to tape devices and more particularly to a tape device in which a tape is alternately and intermittently moved in a plurality of directions relative to an electro-magnetic head and which includes an accumulating means for accumulating increments of a quantity such as increments of time or tape length that are proportional to the net motion of the tape in a single direction in spite of alternate and intermittent motion in at least one other direction.

Description of the prior art

In tape devices such as those by which information is recorded on or transcribed from a magnetic tape or the like, there is a frequent requirement for a measure of the progress of the recording operation, of the transcribing operation, or of both operations in terms of an indication of tape motion during the recording operation, of tape motion during the transcribing operation, or of both tape motions. However, in such tape devices, tape motion is frequently in a direction to provide for the recording or the transcribing of information alternately and intermittently with tape motion in a second and opposite direction to provide for the reviewing of information previously recorded or transcribed. This has caused difficulty in prior art attempts to provide an indication of tape motion during the recording operation or of tape motion during the transcribing operation since most prior art tape devices have simply provided an indication of the gross motion of the tape in a particular direction relative to a reference point.

The difficulty with an indication of the gross motion of the tape is that the gross motion of the tape in a direction to provide for the recording or transcribing of information includes that tape motion necessary for the tape to return to a prior position after the tape has been moved in a second and opposite direction to provide for the reviewing of information previously recorded or transcribed. Thus, in the recording of information on a tape or the transcribing of information from a tape with prior art tape devices, the frequent reversals of the tape for review have resulted in indications of tape motion which are meaningless as a measure of the actual progress of a recording operation or of a transcribing operation.

SUMMARY OF INVENTION

The invention disclosed herein overcomes these and other problems encountered with prior art tape devices in that it provides a tape device in which an indication of only the net motion of a tape in a direction is provided. Thus, with any appropriate display means, the invention provides an indication of the motion of the tape during a recording operation or during a transcribing operation which is a substantially accurate measure of the progress of the operation. These improvements in a tape device are provided by a tape device having an accumulating means for accumulating only the increments of operating time which are proportional to the net motion of the tape in one of two directions in connection with a particular operation of the tape device such as a recording operation or a transcribing operation. The accumulating means includes cumulating means for accumulating increments of operating time corresponding to tape motion in a first direction, and control means for preventing operation of the cumulating means during an increment of time corresponding to tape motion in the first direction required to return the tape to its position prior to tape motion in a second direction opposite to the first direction or which is otherwise not in connection with a particular operation of the tape device.

In one embodiment of the invention, the control means is a circuit means for energizing the cumulating means only during tape motion in the first direction in connection with a particular operation such as a recording operation. In another embodiment of the invention, the control means includes conditioning means for changing the condition of each increment of tape length from a first condition to a second condition as the increment of tape length moves in a second direction relative to a reference point and a signaling means responsive to the second condition of the tape for rendering the cumulating means inoperative as long as increments of tape length in the second condition are passing the reference point in the first direction.

These and other features and advantages of the invention will be more clearly understood upon consideration of the following specification and the accompanying drawing wherein like characters of reference designate corresponding parts throughout and in which:

Figures 1, 2, 3:
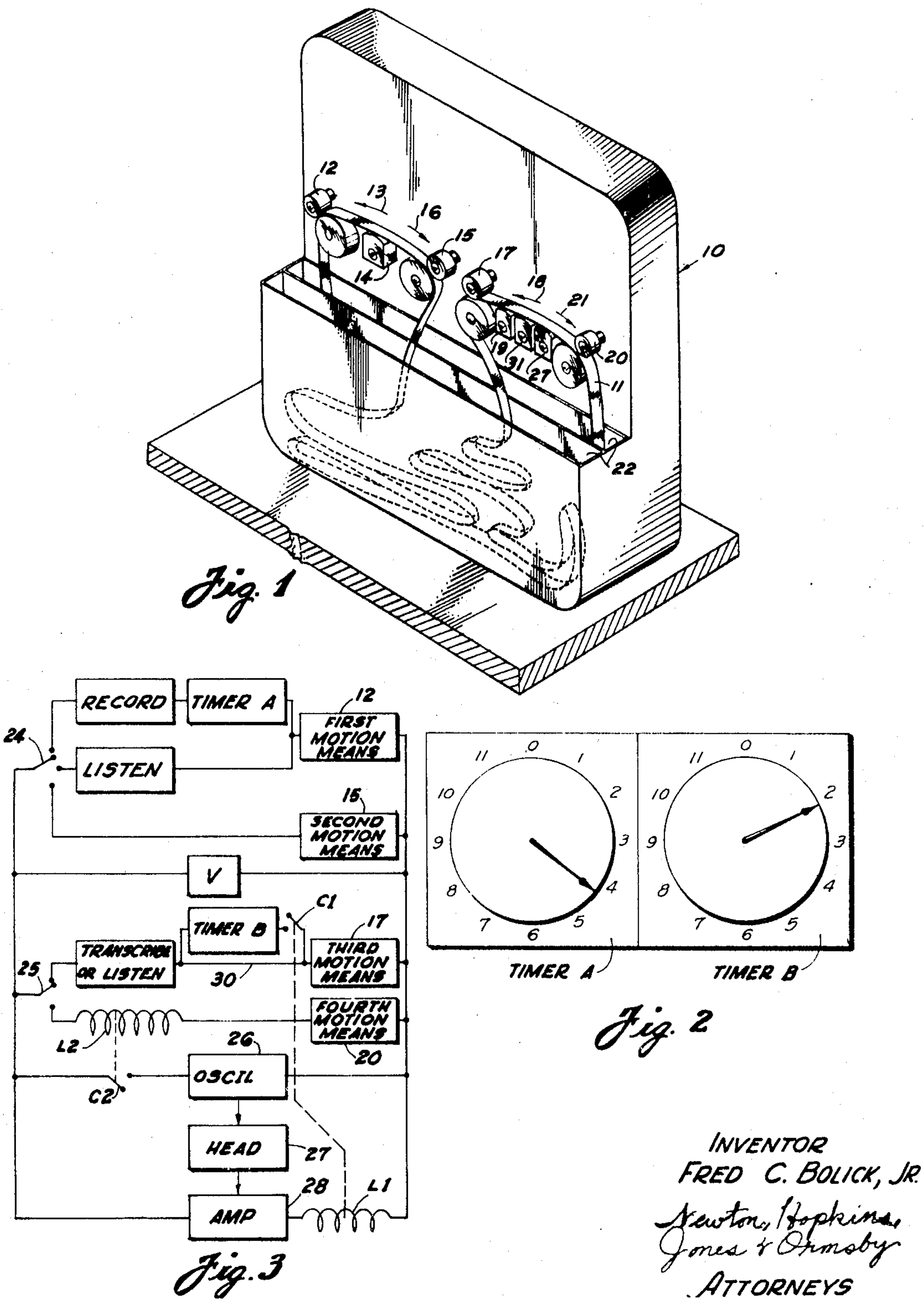
FIG. 1 is a perspective view of a tape device embodying the invention disclosed herein.
FIG. 2 is a front elevational view of a plurality of cumulating means suitable for accumulating increments of plurality of operating times and displaying the net tape motions in connection with a plurality of operations such as recording or transcribing so as to provide an arrangement by which the progress of one operation may be readily compared with the progress of another operation.
FIG. 3 is a schematic diagram of a portion of the circuit of a tape device showing two embodiments of the invention in a conventional tape device.

These figures and the following detailed description disclose specific embodiments of the invention; however, it is to be understood that the invention may be embodied in other equivalent forms.

DESCRIPTION OF SEVERAL EMBODIMENTS

The invention disclosed herein may be most easily understood in terms of a tape device 10 similar to that shown in U.S. Patent No. 2,989,594 to M. B. McKaig and which provides for the simultaneous recording and transcribing of information on a single endless tape 11. Characteristically, such a tape device 10 includes a first motion means 12 for moving the tape 11 in a recording or listening direction 13 relative to a recording-listening head 14, a second motion means 15 for moving the tape 11 in the opposite and recording-review direction 16 relative to the recording-listening head 14, a third motion means 17 for moving the tape 11 in a transcribing or listening direction 18 relative to a listening head 19, and a fourth motion means 20 for moving the tape 11 in the opposite and transcribing-review direction 21 relative to the listening head 19. The directions 13, 16, 18, and 21 of motion of the tape 11 are generally conventional and provide for the simultaneous recording and transcribing of information on the tape 11 with intermittent recording review and transcribing review and for the feeding of the tape 11 into and out of a plurality of tape bins 22 as will be understood by those skilled in the art.

A tape device 10 of the type generally described above has been chosen to illustrate several embodiments of the invention disclosed herein since the tape device 10 is typical of tape devices in which only the net motion of the tape 11 relative to a head 14 or 19 is indicative of the progress of a recording operation or of the progress of a transcribing operation. This is because in a tape device such as the tape device 10, the tape 11 may be moved many times in the recording-review direction 16 or the transcribing-review direction 21 alternately and intermittently with being moved in the recording or listening direction 13 or in the transcribing or listening direction 18 and because the motion of the tape 11 relative to a head 14 or 19 in the recording or listening direction 13 or in the transcribing or listening direction 18 after motion of the tape 11 in the recording-review direction 16 or in the transcribing-review direction 21 is simply for listening to previously recorded or previously transcribed information and does not contribute to the progress of a recording operation or of a transcribing operation.

As is best seen from FIG. 3, two embodiments of the invention are disclosed herein and a cumulating means such as a timer A or a timer B is provided in each embodiment of the invention to accumulate the increments of operating time during which the tape 11 is moving relative to the recording-listening head 14 in the recording or listening direction 13 or relative to the listening head 19 in the transcribing or listening direction 18. In that embodiment of the invention including the timer A, the timer A is operatively included in the circuit of the first motion means 12 so that when a control switch 24 is placed in its upper position as shown in FIG. 3 to provide motion of the tape 11 in the recording or listening direction 13 in connection with the recording operation, the timer A is operative.

It will be understood from FIG. 3 that when the control witch 24 is placed in its lower position, the second motion means 15 is operative to provide motion of the tape 11 in the recording-review direction 16 and the timer A is inoperative. It will also be understood from FIG. 3 that the timer A is also inoperative when the control switch 24 is in its middle position and the first motion means 12 is operative to provide motion of the tape 11 in the recording or listening direction 13 for the operation of listening to previously recorded information.

The use of two separate positions of the control switch 24 to provide motion of the tape 11 in the recording or listening direction 13 and the rendering of the timer A operative in only one of these two separate positions provides a circuit means for energizing the timer A only when the tape 11 is moving in the recording or listening direction 13 in connection with the recording operation even though the operation of recording information and the operation of listening to previously recorded information both require motion of the tape 11 in the recording or listening direction 13. Thus, in that embodiment of the invention including the timer A, the timer A is combined with a circuit means which serves as a control means for controlling the operation of the timer A in such a manner that an accumulating means is provided for accumulating only those increments of time proportional to the motion of the tape 11 in the recording or listening direction 13 during which the recording operation is actually occurring.

Moreover, the time accumulated by the timer A will be proportional to the net motion of the tape 11 during the recording operation if the control switch 24 is always moved from its middle position to its upper position as shown in FIG. 3 only after listening to all previously recorded information. This is normally the case in the use of a tape device such as the tape device 10 and it is for this reason that the embodiment of the invention including the timer A may be considered as including an accumulating means for accumulating only increments of operating time which are proportional to the net motion of the tape 11 in the recording and listening direction 13. However, it should be understood that if the control switch 24 is frequently moved from its middle position to its upper position as shown in FIG. 3 without listening to all previously recorded information so that a change in previously recorded information may be made, the time accumulated by the timer A will become progressively disproportional to the net motion of the tape 11 in the recording and listening direction 13.

In that embodiment of the invention including the timer B as a cumulating means for accumulating increments of time corresponding to motion of the tape 11, the timer B, unlike the timer A, cannot be made operative whenever a switching means such as the control switch 24 is in a particular position so as to provide an indication of the net motion of the tape 11 in the transcribing or listening direction 18. This is because unlike the operations of recording and listening to previously recorded information, the operations of transcribing and listening to previously transcribed information are substantially identical operations so that in most prior art tape devices such as the tape device 10, a single position of a control switch 25 is used for both the operation of transcribing and the operation of listening to previously transcribed information. This single position of the control switch 25 is the upper position of the control switch 25 as shown in FIG. 3 and it will now be understood that the control means which is combined with the timer B to provide the accumulating means of an embodiment of the invention must be different from the control means which is combined with the timer A.

Thus, in that embodiment of the invention including the timer B, the control means includes a conditioning means such as an oscillator 26 operatively connected to a recording-reading head 27 so that when the oscillator 26 is energized the condition of one tract of the tape 11 is changed from a first condition to a second condition so as to provide control information on the tape 11. The control means also includes a signal means such as the amplifier 28 operatively connected to the recording-reading head 27 to allow an energizing output to pass to a relay L1 when the recording-reading head 27 reads the second condition of the tape 11.

From FIG. 3, it will be seen that the oscillator 26 is in series with the normally open contacts C2 of a relay L2 which is energized to close the contacts C2 when the control switch 25 is placed in its lower position as shown in FIG. 3 to operate the fourth motion means 20 and provide motion of the tape 11 in the transcribing review direction 21. It will also be seen from FIG. 3, that the normally closed contacts C2 of the relay L1 are in series with the timer B so that the timer B is inoperative when the relay L1 is being energized by the amplifier 28 even though the control switch 25 is in its upper position as shown in FIG. 3 to provide for operation of the third motion means 17 and motion of the tape 11 in the transcribing or listening direction 18. A by-pass circuit 30 is provided in parallel with the timer B and the contacts C1 to provide for operation of the third motion means 17 whenever the control switch 25 is in its upper position regardless of whether the contacts C1 are open or closed.

The operation of that embodiment of the invention including the timer B will now be apparent. Whenever the control switch 25 is in its lower position as shown in FIG. 3 to provide for motion of the tape 11 in the transcribing-review direction 21, the oscillator 26 and recording-reading head 27 serve to change the condition of each increment of length of the tape 11 passing the recording-reading head 27 in the transcribing review direction 21 from a first condition to a second condition. When the control switch 25 is subsequently moved from its lower position to its upper position for motion of the tape 11 in the transcribing or listening direction 18, those increments of length of the tape 11 in the second condition which pass the recording-reading head 27 provide an input to the amplifier 28 which results in the contacts C1 opening to render the timer B inoperative until these increments of length of the tape 11 have all passed the recording-reading head 27. An erasing head 31 is provided to change the condition of the tape 11 from the second condition to its first condition subsequent to the tape 11 passing the recording-reading head 27.

Thus, as in that embodiment of the invention including the timer A, the embodiment of the invention including the timer B has a control means which with the timer B serving as a cumulating means provides an accumulating means for accumulating increments of time proportional to the net motion of the tape 11 in a first direction, such as the transcribing or listening direction 18, in spite of alternate and intermittent motion of the tape 11 in a second direction, such as the transcribing-review direction 21. It will be understood that the timer A or the timer B may be any conventional means for accumulating that lapsed time which is the difference between the time that tape motion in one direction occurs in connection with a particular operation and the time that tape motion in the opposite direction occurs and that each may serve as an indicating means for indicating the net motion of the tape 11 in a particular direction. Thus, when the timer A and the timer B are arranged side by side as shown in FIG. 2, the progress of a transcribing operation may be readily compared with the indicated length of a completed recording operation which is being transcribed or with the progress of a simultaneously occurring recording operation.

However, it will also be understood that the timer A and the timer B are merely representative of a cumulating means which will accumulate increments of a quantity such as operating time or tape length corresponding to motion of the tape 11 and which with a control means for excluding increments of the quantity which do not contribute to net motion of the tape 11 in a particular direction in connection with a particular operation of the tape device will provide the accumulating means of the invention.

Further, it will be understood that the tape device 10 is merely representative of many tape devices in which the invention may be embodied and that the details of each tape motion means 12, 15, 17 or 20 or of certain circuits required for a fully operative tape device 10 have not been disclosed because they will be understood by those skilled in the art.

I claim:

1. In a tape device in which a tape is moved for recording or transcribing, first driving means for driving a tape in a first direction, second driving means for driving a tape in a second direction, indicating means for indicating the amount of a tape which is driven in said first direction, and control means for preventing the operation of said indicating means when the tape which is being driven in said first direction has been previously driven in said second direction.

2. The tape device of claim 1 in which said indicating means and said control means are an accumulating means for accumulating increments of a quantity proportional to net motion of said tape in said first direction.

3. The tape device of claim 1 in which said indicating means is a cumulating means operative as said tape is driven in said first direction for accumulating increments of a quantity proportional to motion of said tape in said first direction and in which said control means is a circuit means for selectively rendering said cumulating means operative only when a control switch is in one of a plurality of positions that renders said first driving means operative.

4. The tape device of claim 1 in which said control means includes conditioning means for changing the condition of successive increments of said tape from a first condition to a second condition as said tape moves in said second direction, and signal means responsive to said second condition of said tape as said tape moves in said first direction for rendering said indicating means inoperative.

5. In a tape device in which a tape is moved relative to a first electro-magnetic head in a first direction and in a second direction opposite to said first direction; first cumulating means operative responsive to motion of said tape in said first direction for accumulating increments of a quantity related to increments of said motion of said tape in said first direction; control means for selectively rendering said first cumulating means inoperative to accumulate increments of said quantity in proportion to motion of said tape in said second direction; and second cumulating means for accumulating increments of a quantity related to increments of motion of said tape in a third direction relative to a second electro-magnetic head.

6. In a tape device in which a tape is moved relative to an electro-magnetic head in a first direction and in a second direction opposite to said first direction, cumulating means operatively responsive to motion of said tape in said first direction for accumulating increments of a quantity related to increments of said motion of said tape in said first direction, conditioning means for progressively changing the condition of said tape from a first condition to a second condition as said tape moves in said second direction, and signal means responsive to said second condition as said tape moves in said first direction for providing a signal to said cumulating means which renders said cumulating means inoperative.

7. The device of claim 6 including erasing means for changing the condition of said tape from said second condition to said first condition subsequent to the response of said signal means to said second condition.

8. The tape device of claim 7 in which said cumulating means includes indicating means for indicating increments of said quantity.

9. In a tape device for recording and transcribing information on a tape as said tape moves relative to a recording head and a transcribing head, first motion means operative for moving said tape in a first direction relative to said recording head, second motion means operative for moving said tape in a first direction relative to said transcribing head, third motion means operative for moving said tape in a second direction relative to said transcribing head, first cumulating means simultaneously operative with said first motion means for accumulating a quantity proportional to the time said first motion means is operative, conditioning means simultaneously operative with said second motion means for progressively recording control information on said tape, signal means responsive to said control information for providing a signal, and second cumulating means simultaneously operative with said third motion means for accumulating a second quantity proportional to the difference between the time said third motion means is operative and the duration of said signal.

References Cited

UNITED STATES PATENTS

| | | | |
|---|---|---|---|
| 2,952,746 | 9/1960 | Sampson | 179—100.2 |
| 2,988,604 | 6/1961 | Nye | 179—100.2 |
| 3,024,320 | 3/1962 | Nye | 179—100.2 |
| 3,197,562 | 7/1965 | Happold et al. | 179—6 |
| 3,045,884 | 7/1962 | Buhrendorf. | |
| 3,050,594 | 8/1962 | Bick et al. | |
| 3,131,384 | 4/1964 | Kietz et al. | |

BERNARD KONICK, Primary Examiner

J. RUSSELL GOUDEAU, Assistant Examiner

U.S. Cl. X.R.

179—6, 100.1